United States Patent
Montrym et al.

(10) Patent No.: US 9,013,498 B1
(45) Date of Patent: Apr. 21, 2015

(54) DETERMINING A WORKING SET OF TEXTURE MAPS

(75) Inventors: John S. Montrym, Los Altos Hills, CA (US); Andrew J. Tao, San Francisco, CA (US); Henry P. Moreton, Woodside, CA (US); Emmett M. Kilgariff, San Jose, CA (US); Cass W. Everitt, Heath, TX (US); Alexander L. Minkin, Los Altos, CA (US); Eric Anderson, Palo Alto, CA (US); Yan Yan Tang, San Jose, CA (US); Jerome F. Duluk, Jr., Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1202 days.

(21) Appl. No.: 12/340,499

(22) Filed: Dec. 19, 2008

(51) Int. Cl.
*G09G 5/00* (2006.01)
*G09G 5/37* (2006.01)

(52) U.S. Cl.
CPC ........................................ *G09G 5/37* (2013.01)

(58) Field of Classification Search
None
See application file for complete search history.

(56) References Cited

U.S. PATENT DOCUMENTS

| | | | | |
|---|---|---|---|---|
| 5,249,273 | A * | 9/1993 | Yoshitake et al. | 712/210 |
| 6,212,605 | B1 * | 4/2001 | Arimilli et al. | 711/133 |
| 6,522,337 | B1 * | 2/2003 | Morioka | 345/582 |
| 6,778,181 | B1 * | 8/2004 | Kilgariff et al. | 345/582 |
| 7,015,909 | B1 * | 3/2006 | Morgan, III et al. | 345/426 |
| 7,053,903 | B1 * | 5/2006 | Junklewitz | 345/531 |
| 7,372,467 | B1 * | 5/2008 | Toksvig et al. | 345/582 |
| 7,409,589 | B2 * | 8/2008 | Mack et al. | 714/15 |
| 7,538,773 | B1 * | 5/2009 | Hutchins | 345/582 |
| 7,603,484 | B2 * | 10/2009 | Dai et al. | 710/5 |
| 7,627,723 | B1 * | 12/2009 | Buck et al. | 711/155 |
| 7,636,832 | B2 * | 12/2009 | Raj et al. | 711/207 |
| 7,649,538 | B1 * | 1/2010 | Minkin et al. | 345/582 |
| 7,965,296 | B2 * | 6/2011 | Xu et al. | 345/552 |
| 2002/0091998 | A1 * | 7/2002 | Fraser et al. | 717/136 |
| 2004/0187135 | A1 * | 9/2004 | Pronovost et al. | 718/104 |
| 2005/0225554 | A1 * | 10/2005 | Bastos et al. | 345/506 |
| 2006/0164429 | A1 * | 7/2006 | Mantor et al. | 345/582 |
| 2006/0245771 | A1 * | 11/2006 | Yamada | 399/38 |
| 2006/0256356 | A1 * | 11/2006 | Furuya | 358/1.9 |
| 2007/0182750 | A1 * | 8/2007 | Teruyama et al. | 345/558 |
| 2008/0022077 | A1 * | 1/2008 | Thekkath et al. | 712/222 |

(Continued)

OTHER PUBLICATIONS

Zhuge et al., CRED: Code Size Reduction Technique and Implementation for Software-Pipelined Applications, University of Texas at Dallas, pp. 1-7.*

(Continued)

*Primary Examiner* — Aaron M Richer
*Assistant Examiner* — Anh-Tuan V Nguyen
(74) *Attorney, Agent, or Firm* — Artegis Law Group, LLP (57) ABSTRACT

A system and method for tracking and reporting texture map levels of detail that are computed during graphics processing allows for efficient management of texture map storage. Minimum and/or maximum pre-clamped texture map levels of detail values are tracked by a graphics processor and an array stored in memory is updated to report the minimum and/or maximum values for use by an application program. The minimum and/or maximum values may be used to determine the active set of texture map levels of detail that is loaded into graphics memory.

28 Claims, 9 Drawing Sheets

(56) References Cited

U.S. PATENT DOCUMENTS

2008/0106552 A1* 5/2008 Everitt .................. 345/552
2008/0201716 A1* 8/2008 Du et al. ................ 718/104
2008/0301683 A1* 12/2008 Archer et al. ........... 718/102
2008/0303841 A1* 12/2008 Newhall, Jr. ........... 345/587
2010/0011198 A1* 1/2010 Hooker et al. ............. 713/1
2010/0091028 A1* 4/2010 Grossman et al. ........ 345/587

OTHER PUBLICATIONS

Cain Dornan, "Gamer Within", www.gamerwithin.com. PC Gaming. May 1, 2006. pp. 1-4.

Eggers, et al. "Simultaneous Multithreading: A Platform for Next-Generation Processors," IEEE Micro, vol. 17, No. 5, pp. 12-19, Sep./Oct. 1997.

* cited by examiner

DETERMINING A WORKING SET OF TEXTURE MAPS

BACKGROUND OF THE INVENTION

1. Field of the Invention

The present invention generally relates to texture maps and more specifically to tracking and reporting texture map level of detail statistics during processing.

2. Description of the Related Art

In conventional graphics systems a working set of texture maps is loaded into local memory for use by a graphics processor. The amount of local memory is limited, so the set of texture mipmap levels of each texture map may not include all of the texture mipmap levels that are used by an application program. When a texture mipmap level is needed that is not available in the local memory, the texture mipmap level may be loaded from a disk drive or other non-local memory, resulting in reduced processing throughput.

Accordingly, what is needed in the art is a system and method for effectively tracking and reporting texture mipmap level accesses to determine which texture mipmap levels should be loaded into local memory.

SUMMARY OF THE INVENTION

A system and method for tracking and reporting texture map levels of detail that are computed during graphics processing allows for efficient management of texture map storage resources. Minimum and/or maximum pre-clamped texture map levels of detail values are tracked by a graphics processor and an array stored in memory is updated to report the minimum and/or maximum values for use by an application program. The minimum and/or maximum values may be used to determine the active set of texture map levels of detail that is loaded into graphics memory.

Various embodiments of a method of the invention for tracking and reporting texture map statistics include receiving an unclamped calculated level of detail value for a texture map and comparing the unclamped calculated level of detail value with a current level of detail limit value for the texture map. When the unclamped calculated level of detail corresponds to a mipmap of the texture map that is higher resolution than a mipmap of the texture map corresponding to the current level of detail limit value the unclamped calculated level of detail is stored as the current level of detail limit value.

Various embodiments of the invention include a system for tracking and reporting texture map statistics. The system includes a texture unit that is configured to calculate an unclamped level of detail value for a texture map and compare the unclamped level of detail value with a current level of detail limit value for the texture map that is stored in an entry of a level of detail limit values table. When the unclamped level of detail corresponds to a mipmap of the texture map that is higher resolution than a mipmap of the texture map corresponding to the current level of detail limit value, the texture unit stores the unclamped level of detail as the current level of detail limit value.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
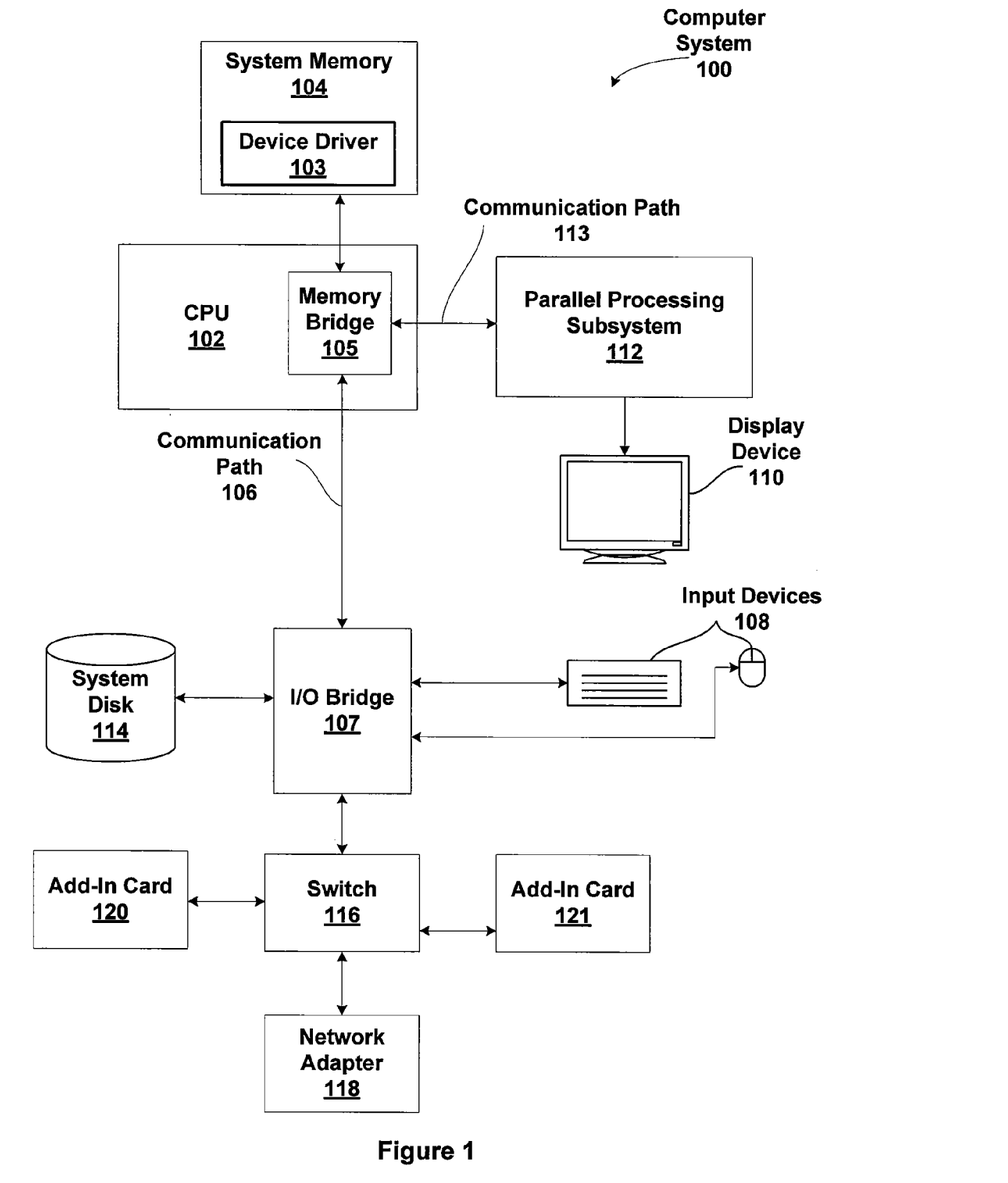
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path through a memory bridge 105. Memory bridge 105 may be integrated into CPU 102 as shown in FIG. 1. Alternatively, memory bridge 105, may be a conventional device, e.g., a Northbridge chip, that is connected via a bus to CPU 102. Memory bridge 105 is connected via communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, one or more of CPU 102, I/O bridge 107, parallel processing subsystem 112, and memory bridge 105 may be integrated into one or more chips. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
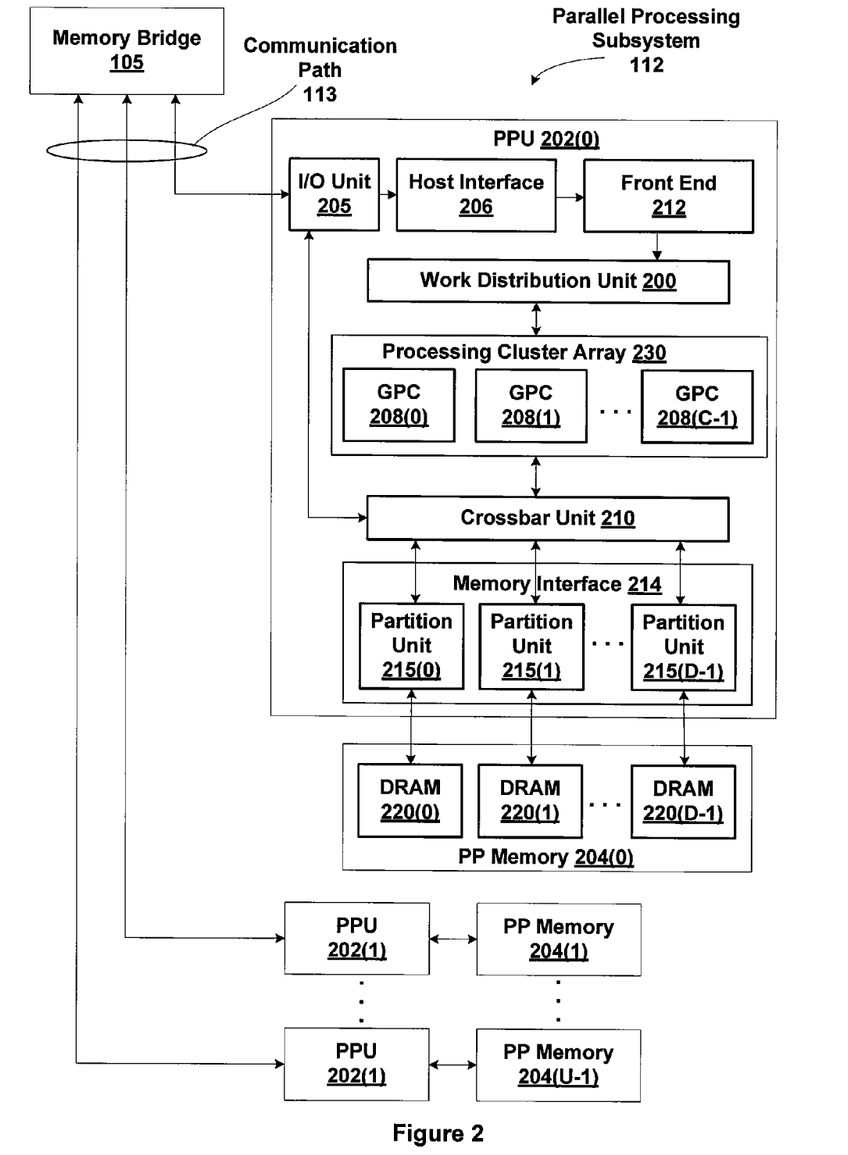
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a command buffer (not explicitly shown in either FIG. 1 or FIG. 2) that may be located in system memory 104, parallel processing memory 204, or another storage location accessible to both CPU 102 and PPU 202. PPU 202 reads the command stream from the command buffer and then executes commands asynchronously relative to the operation of CPU 102. CPU 102 may also create data buffers that PPUs 202 may read in response to commands in the command buffer. Each command and data buffer may be read by each of PPUs 202.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each command buffer and outputs the work specified by the command buffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary depending on the workload arising for each type of program or computation. Alternatively, GPCs 208 may be allocated to perform processing tasks using a time-slice scheme to switch between different processing tasks.

GPCs 208 receive processing tasks to be executed via a work distribution unit 200, which receives commands defining processing tasks from front end unit 212. Processing tasks include pointers to data to be processed, e.g., surface (patch) data, primitive data, vertex data, and/or pixel data, as well as state parameters and commands defining how the data is to be processed (e.g., what program is to be executed). Work distribution unit 200 may be configured to fetch the pointers corresponding to the processing tasks, may receive the pointers from front end 212, or may receive the data directly from front end 212. In some embodiments, indices specify the location of the data in an array. Front end 212 ensures that GPCs 208 are configured to a valid state before the processing specified by the command buffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to output tasks at a frequency capable of providing tasks to multiple GPCs 208 for processing. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. The ability to allocate portions of GPCs 208 for performing different types of processing tasks efficiently accommodates any expansion and contraction of data produced by those different types of processing tasks. Intermediate data produced by GPCs 208 may be buffered to allow the intermediate data to be transmitted between GPCs 208 with minimal stalling in cases where the rate at which data is accepted by a downstream GPC 208 lags the rate at which data is produced by an upstream GPC 208.

Memory interface 214 may be partitioned into a number D of memory partition units that are each coupled to a portion of parallel processing memory 204, where D≥1. Each portion of parallel processing memory 204 generally includes one or more memory devices (e.g DRAM 220). Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 215 to communicate with I/O unit 205, as well as a connection to local parallel processing memory 204, thereby enabling the processing cores within the different GPCs 208 to communicate with system memory 104 or other memory that is not local to PPU 202. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
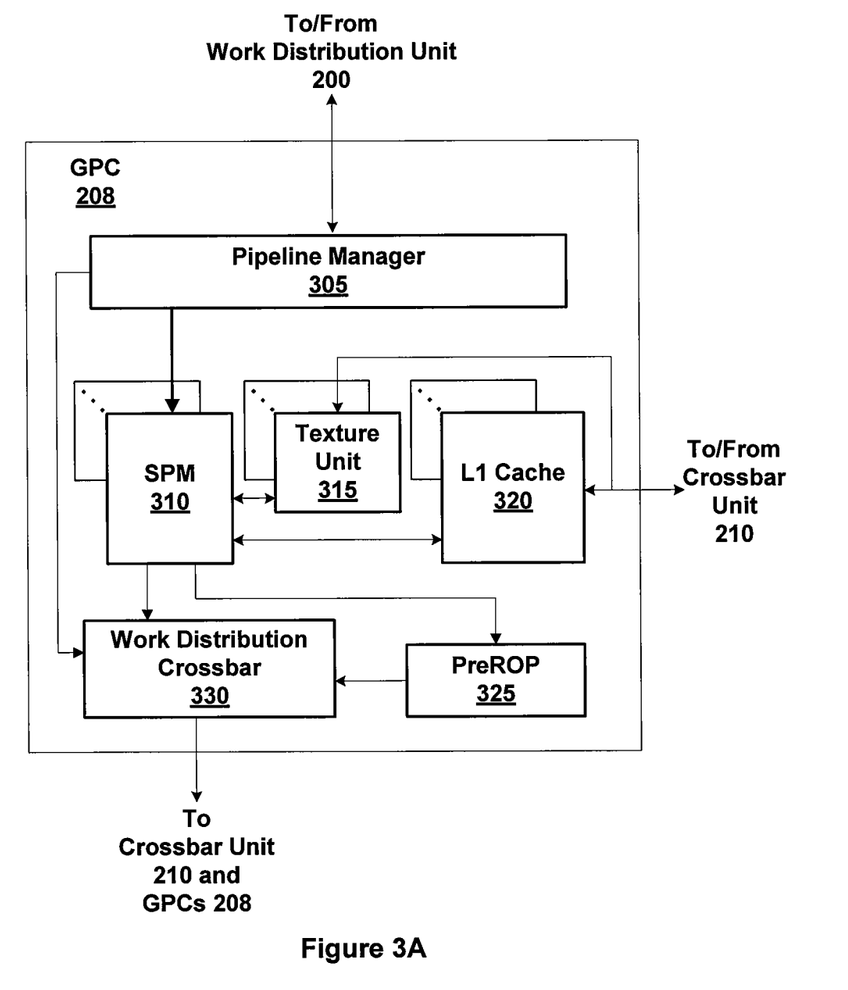
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

In graphics applications, a GPC 208 may be configured to implement a primitive engine for performing screen space graphics processing functions that may include, but are not limited to primitive setup, rasterization, and z culling. The primitive engine receives a processing task from work distribution unit 200, and when the processing task does not require the operations performed by primitive engine, the processing task is passed through the primitive engine to a pipeline manager 305. Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

Also, each SPM 310 advantageously includes an identical set of functional units (e.g., arithmetic logic units, etc.) that may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

In one embodiment, each GPC 208 includes a number M of SPMs 310, where M≥1, each SPM 310 configured to process one or more thread groups. The series of instructions transmitted to a particular GPC 208 constitutes a thread, as previously defined herein, and the collection of a certain number of concurrently executing threads across the parallel processing engines (not shown) within an SPM 310 is referred to herein as a "thread group." As used herein, a "thread group" refers to a group of threads concurrently executing the same program on different input data, with each thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over multiple clock cycles. Since each SPM 310 can support up to G thread groups concurrently, it follows that up to G×M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA"). The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

An exclusive local address space is available to each thread, and a shared per-CTA address space is used to pass data between threads within a CTA. Data stored in the per-thread local address space and per-CTA address space is stored in L1 cache 320, and an eviction policy may be used to favor keeping the data in L1 cache 320. Each SPM 310 uses space in a corresponding L1 cache 320 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. An L2 cache may be used to store data that is written to and read from global memory. It is to be understood that any memory external to PPU 202 may be used as global memory.

In graphics applications, a GPC 208 may be configured such that each SPM 310 is coupled to a texture unit 315 for performing texture mapping operations, e.g., determining texture sample positions, reading texture data, and filtering the texture data. Texture data is read via memory interface 214 and is fetched from an L2 cache, parallel processing memory 204, or system memory 104, as needed. Texture unit 315 may be configured to store the texture data in an internal cache. In some embodiments, texture unit 315 is coupled to L1 cache 320, and texture data is stored in L1 cache 320. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing engines, e.g., primitive engines 304, SPMs 310, texture units 315, or preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing engines, L1 caches 320, and so on.

Figure 3B:
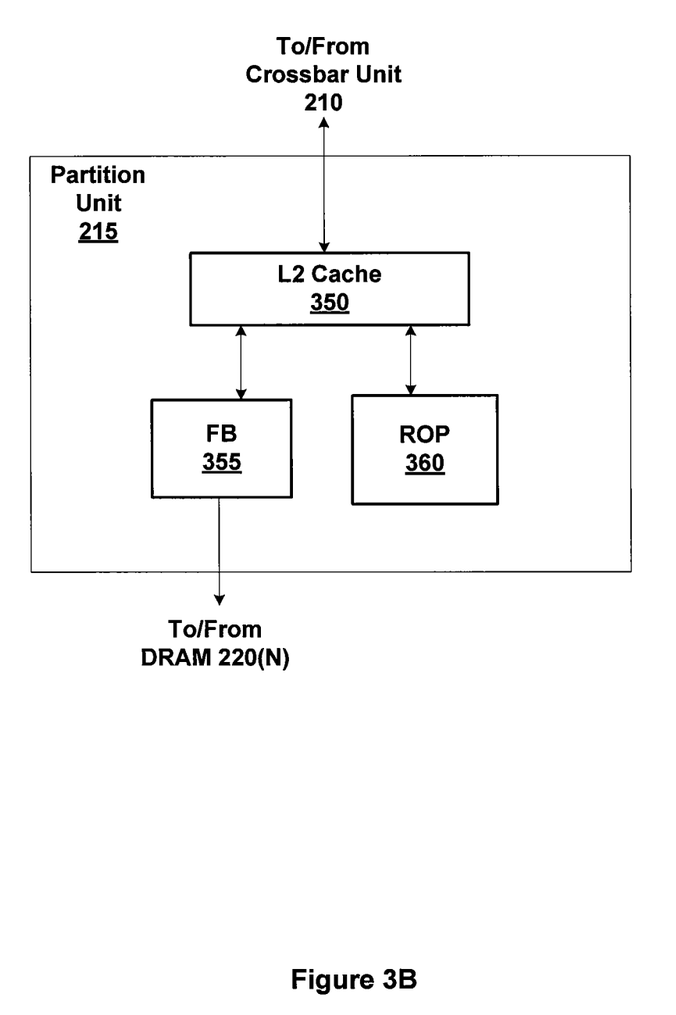
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB 355 for processing. Dirty updates are also sent to FB 355 for opportunistic processing. FB 355 interfaces directly with DRAM 220(N), outputting read and write requests and receiving data read from DRAM 220(N).

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Graphics Pipeline Architecture

Figure 4:
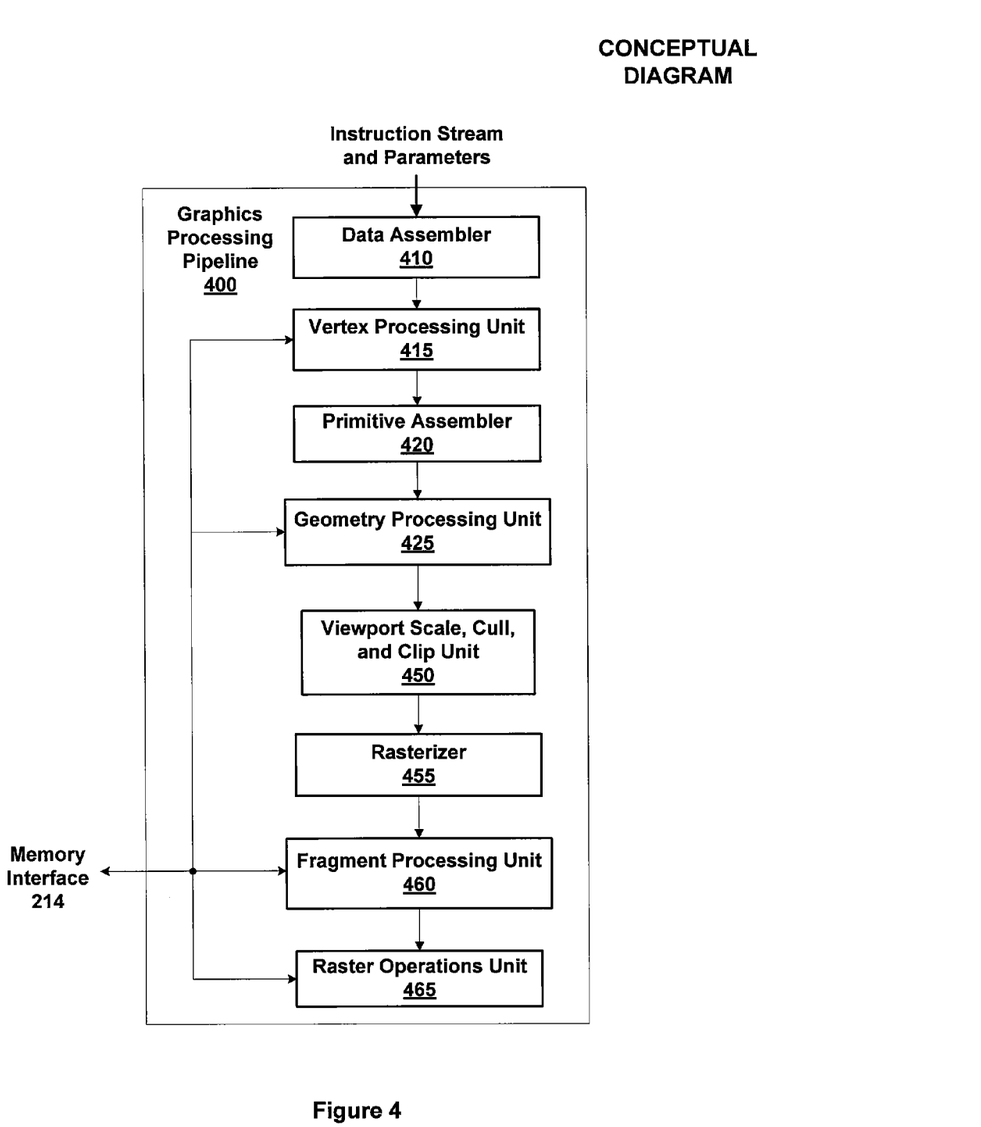
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Gathering and Reporting Texture Map Statistics

As the number and resolution of texture maps used by application programs has increased, texture map management techniques have evolved to load a working set of "active" texture maps into PP memory 204. The active texture maps stored in PP memory 204 are accessed with low latency compared with texture maps stored in system memory 104 or system disk 114, so texture maps are moved to PP memory 204 as they become active.

When all of the mipmap levels of detail for the active texture maps are not needed, the amount of PP memory 204 needed to store the active texture maps may be reduced by only storing the levels of detail (LODs) for each texture that are needed. Texture unit 315 may be configured to clamp texture map LOD values to only access texture map LODs that are resident in PP memory 204. For example, when a texture map with a finest resolution LOD of 2048×2048 texels is not active, a fine LOD clamp value may be set to clamp a fine LOD value computed by texture unit 315 to access an LOD of 1024×1024 texels. In embodiments of computer system 100 where a decreasing LOD corresponds to a higher resolution (finer) LOD, the LOD clamp value is a minimum LOD value. The computed LOD values may also be clamped using a maximum LOD value that corresponds to a lowest resolution (coarse) LOD that is resident in PP memory 204.

Tracking and reporting the texture map LOD statistics allows an application developer to know which resident texture map LODs are being used, and which LODs would be used if those LODs were resident for the texture map. This enables the application developer to evict LODs that are not being used from PP memory 204 and transfer LODs to PP memory 204 that would be used if the LODs for a particular texture map were not clamped. Device driver 103 may be configured to manage the active texture map LODs, performing LOD eviction and loading other LODs on a frame-by-frame or scene-by-scene basis for each application program. PPU 202 is configured to track and report the pre-clamped LOD limit (fine and/or coarse) values that were computed by texture unit 315. The LOD statistics are stored as an LOD array in PP memory 204 and updated during graphics processing. Device driver 103 may initialize the array and read the LOD array during graphics processing. In some embodiments of the present invention, the LOD array is stored in system memory 104.

Figure 5:
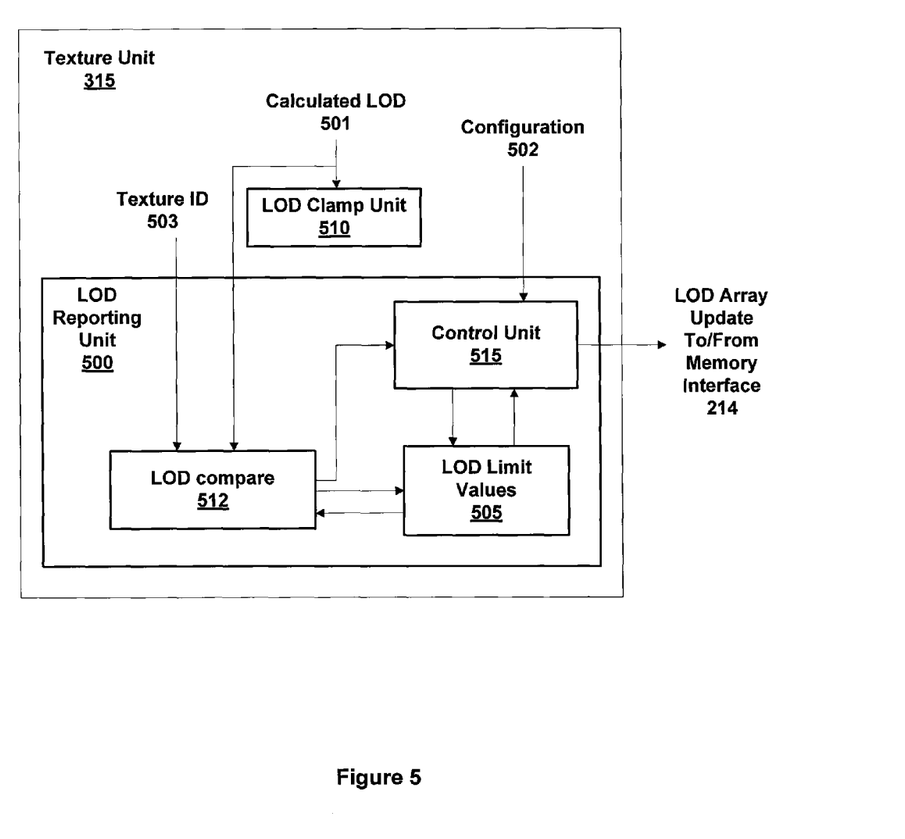
FIG. 5 is a block diagram of a portion of the texture unit of FIG. 3A, according to one embodiment of the present invention.

FIG. 5 is a block diagram of a portion of texture unit 315 of FIG. 3A, according to one embodiment of the present invention. Texture unit 315 calculates LOD values based on texture map coordinates, using techniques known to those skilled in the art. The calculated LOD values are shown in FIG. 5 as calculated LOD 501. In some embodiments of the present invention, a coarse and a fine LOD value is computed for four pixels arranged in a 2×2 quad. Minimum and maximum LOD clamp values may be stored in an LOD clamp unit 510 to clamp the calculated LOD to a fine and coarse LOD limit values, respectively. The clamped LOD value is used to read texels from the texture map during graphics processing. Calculated LOD values, received as calculated LOD 501, are monitored by LOD tracking and reporting unit 500 for each active texture map.

LOD tracking and reporting unit 500 also receives configuration 502 from device driver 103 that is used to enable and disable LOD statistics tracking. Configuration 502 may also provide coarse and fine LOD limit values that are used to initialize or write entries in a LOD limit values 505 through a control unit 515 and evict LOD values for a texture map from coarse and fine LOD values 505. When configured to track LOD statistics, control unit 515 receives comparison results for each calculated LOD 501 from a LOD compare 512 and outputs LOD array updates to memory interface 214. LOD compare 512 reads an entry of LOD limit values 505 corresponding to a texture ID 503. LOD compare 512 outputs a compare result to control unit 515, indicating whether or not either the fine or coarse LOD value read from the entry should be updated to calculated LOD 501.

In some embodiments of the present invention, LOD limit values 505 includes 256 entries for storing fine LOD limit values and coarse LOD limit values. Each entry may also be configured to store a bit indicating whether or not the entry has been updated based on a comparison result. When different shaders (e.g., tessellation shader, vertex shader, geometry shader, and/or pixel shader programs), may access texture data associated with a texture ID 503, LOD tracking may be separately enabled or disabled for each different shader, and each entry in LOD limit values 505 may include a mask for enabling/disabling LOD tracking for the shaders.

Figure 6A:
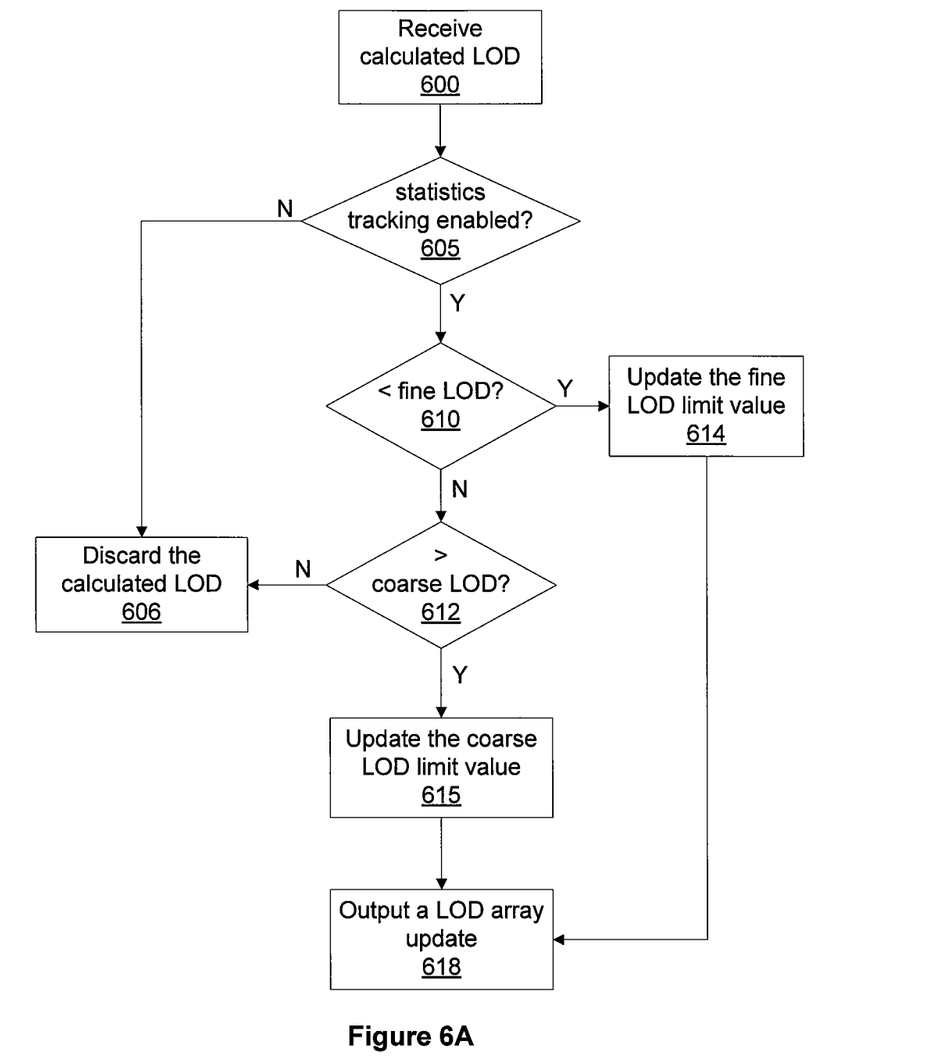
FIG. 6A is a flow diagram illustrating a method of tracking and reporting texture map levels of detail statistics, according to one embodiment of the present invention.

FIG. 6A is a flow diagram illustrating a method of tracking and reporting texture map LOD statistics, according to one embodiment of the present invention. Before enabling LOD statistics tracking, device driver 103 initializes the LOD limit values stored in LOD limit values 505 to predetermined minimum and maximum values. In step 600 a calculated LOD is received by LOD tracking and reporting unit 500 and LOD compare 512 compares the calculated LOD with the LOD (fine and/or coarse) limit values read from LOD limit values 505 for the texture map associated with the texture ID. In step 605 control unit 515 determines if LOD statistics tracking is enabled, and, if not in step 606 the calculated LOD is discarded. Otherwise, in step 610 control unit 515 determines if the compare results provided by LOD compare 512 indiate that calculated LOD is finer (less than) the fine LOD limit value stored in LOD limit values 505. If, the calculated LOD is finer, then in step 614 the fine LOD limit value stored for the texture map is updated to equal the calculated LOD value. In step 618 control unit 515 outputs an LOD array update to report the change in the fine LOD limit value.

If, in step 610, the calculated LOD is not finer than the fine LOD limit value stored in LOD limit values 505 for the texture map, then in step 612 control unit 515 determines if the compare results provided by LOD compare 512 indicate that calculated LOD is coarser (greater than) the coarse LOD limit value stored in LOD limit values 505 for the texture map. When the calculated LOD is not coarser, then in step 606 the calculated LOD is discarded. Otherwise, in step 615 the coarse LOD limit value stored for the texture map is updated to equal the calculated LOD value. In step 618 control unit 515 outputs an LOD array update to report the change in the coarse LOD limit value.

The internal reporting path used to transmit LOD array updates to the LOD array stored in PP memory 204 passes directly from texture units 315 to memory interface 214. It is not necessary for the LOD array updates to pass through the graphics pipeline, i.e., from texture unit 315 and through SPM 310, since the updates do not need to be synchronized with the pixel data. A virtual or physical address may be provided to with the LOD array update using a base address for the LOD array. The base address may be included in configuration 502 and stored in LOD tracking and reporting unit 500.

Since each texture unit 315 may produce LOD array updates, possibly for the same texture map, the LOD updates are performed by comparing the LOD limit value in each update with the existing LOD limit value stored in the LOD array. This compare operation is performed by ROP 360. LOD array updates including fine limit values are processed by writing the new fine limit value when it is less than (finer) that the fine LOD limit value stored in the LOD array for the texture map. LOD array updates including coarse limit values are processed by writing the new coarse limit value when it is greater than (coarser) the coarse LOD limit value stored in the LOD array for the texture map.

ROP 360 may also be used to perform a compare between two LOD arrays, to generate a list of update events for use by device driver 103. For example, an LOD array for a first frame or scene may be compared with an LOD array for a subsequent frame or scene to identify LOD limit values that have changed during processing. This list of update events may then be used to identify texture map LODs for eviction and texture map LODs that will be loaded into PP memory 204 for processing of the next frame or scene.

As previously explained, fetching texture data from PP memory 204 improved processing performance compared with fetching texture data from system memory 104 or system disk 114. Reducing the frequency of LOD clamping for fine LOD values improves image quality since the higher resolution texture map data can be used to render an image. Reducing the frequency of LOD clamping for coarse LOD values may improve performance or image quality since the texture data requires less filtering to produce texel values during rendering.

Figure 6B:
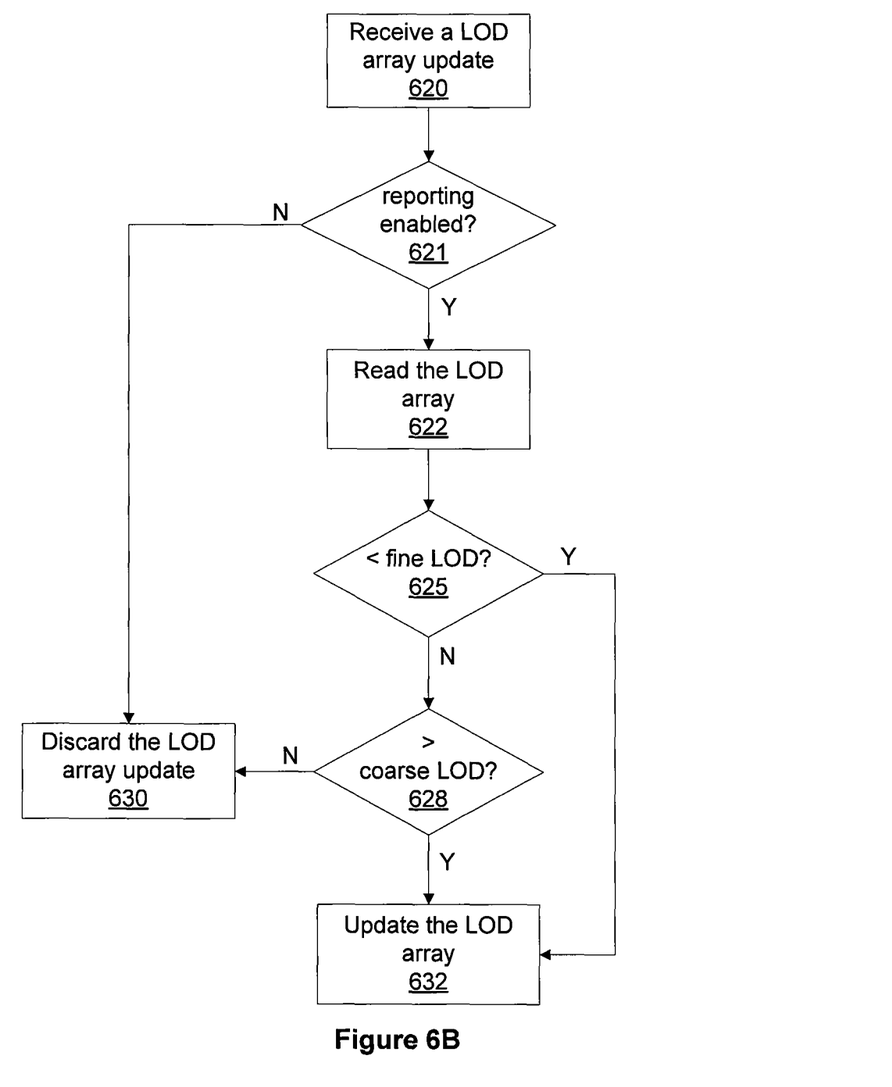
FIG. 6B is a flow diagram illustrating a method of processing an update for texture map levels of detail statistics, according to one embodiment of the present invention.

FIG. 6B is a flow diagram illustrating a method of processing an update for texture map LOD statistics, according to one embodiment of the present invention. In step 620 ROP 360 receives an LOD array update from a texture unit 315. The LOD array update includes a fine or coarse LOD limit value and a physical address. A virtual address provided by texture unit 315 may be converted to a physical address before the LOD array update reaches ROP 360. LOD statistics reporting may be enabled separately from LOD statistics tracking. In step 621 ROP 650 determines if LOD statistics reporting is enabled, and, if not in step 630 the LOD array update is discarded. Otherwise, in step 622 ROP 360 reads the LOD array using the physical address to obtain the current LOD limit values for the texture map. In step 625 ROP 360 compares the LOD limit value included with the LOD array update with the current fine LOD limit value. If, the LOD array update LOD limit value is finer, then in step 632 the LOD limit value included with the LOD array update is written as the current fine LOD limit value stored for the texture map in the LOD array.

Otherwise, in step 628 ROP 360 compares the LOD limit value included with the LOD array update with the current coarse LOD limit value. If, the LOD limit value included with the LOD array update is coarser (greater than) the current coarse LOD limit value, then in step 632 the LOD limit value included with the LOD array update is written as the current coarse LOD limit value stored for the texture map in the LOD array. Otherwise, in step 630 the LOD array update is discarded.

Figure 6C:
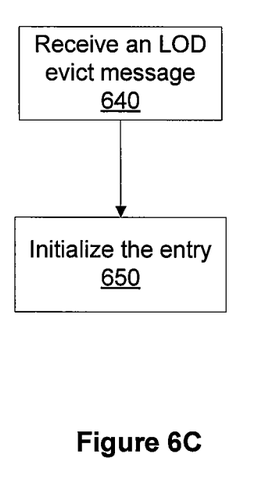
FIG. 6C is a flow diagram illustrating a method of managing the tracking of texture map levels of detail statistics.

FIG. 6C is a flow diagram illustrating a method of managing the tracking of texture map LOD statistics. An entry in LOD limit values 505 storing limit values for a texture map may be evicted and reused for a different texture map in order to effectively manage the texture storage resources as different texture maps become active and inactive. An evict message may evict a single entry or may evict all of the entries in LOD limit values 505. An evict message includes an entry address, texture ID, and a flag indicating whether or not LOD statistics tracking is enabled for the texture ID.

In step 640 LOD tracking and reporting unit 500 receives an evict message via configuration 502. When an evict message that evicts all of the entries is received, LOD tracking and reporting unit 500 repeats the steps shown in FIG. 6C for each entry of LOD limit values 505. In step 650 the entry for the texture map is initialized. An entry is initialized by setting the LOD fine limit value to a predetermined maximum (assuming lower values correspond to higher resolution mipmaps) and setting the LOD coarse limit value to a predetermined minimum (assuming higher values correspond to lower resolution mipmaps).

In some embodiments of the present invention, the tracking and reporting of LOD statistics is performed without using LOD tracking and reporting unit 500. Instead additional commands are included in an application program to store and report the unclamped LOD values. Although this mechanism may reduce the processing performance, it beneficially does not require specialized circuitry within PPU 202 to perform the tracking and reporting functions. When LOD tracking and reporting unit 500 is used and LOD statistics tracking is enabled, an entry in LOD limit values 515 may be updated for each TEX command that is executed.

In addition to the TEX command, two additional commands may be included in an application program to perform the LOD tracking without using LOD tracking and reporting unit 500. The two additional commands are TEXLOD and GRED, an atomic reduction command that is executed by ROP 360. TEXLOD computes the unclamped LOD value and stores the unclamped LOD value into a register, e.g., Rn. GRED includes the register as an operand, along with the reduction operator (minimum or maximum) and a TexIndex specifying the location of the LOD array in memory. The sequence of commands, including the TEX command, is:

TEX(A)
Rn=TEXLOD
GRED min (TexIndex), Rn
GRED max (TexIndex), Rn

The GRED uses a min (minimum) reduction operator to update the LOD array for the fine LOD and a max (maximum) reduction operator to update the LOD array for the coarse LOD.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method for tracking and reporting texture map statistics, the method comprising:
    receiving an unclamped calculated level of detail value for a texture map;
    comparing the unclamped calculated level of detail value with a current level of detail limit value for the texture map;
    determining that the unclamped calculated level of detail value corresponds to a mipmap of the texture map that is higher resolution than a mipmap of the texture map corresponding to the current level of detail limit value;
    storing the unclamped calculated level of detail value as the current level of detail limit value for the texture map;
    for each shader included in a plurality of shaders, identifying whether the shader is enabled for texture map statistics tracking; and
    if the unclamped calculated level of detail value is associated with a shader included in the plurality of shaders that is enabled for texture map statistics tracking, then generating a level of detail array update that includes the unclamped calculated level of detail value,
        wherein the level of detail array update is used to report the unclamped calculated level of detail value as the current level of detail limit value stored in a level of detail array for the texture map, and
    if the unclamped calculated level of detail value is associated with a shader included in the plurality of shaders that is not enabled for texture map statistics tracking, then discarding the unclamped calculated level of detail value.

2. The method of claim 1, further comprising the step of determining that texture map statistics tracking is enabled for the texture map.

3. The method of claim 1, further comprising the steps of:
    reading a reported level of detail limit value stored in the level of detail array for the texture map;
    comparing the unclamped calculated level of detail value included in the level of detail array update with the reported level of detail limit value;
    determining that the unclamped calculated level of detail value corresponds to a mipmap of the texture map that is higher resolution than a mipmap of the texture map corresponding to the reported level of detail limit value; and
    storing the unclamped calculated level of detail value as the reported level of detail limit value.

4. The method of claim 1, further comprising the step of initializing the current level of detail limit value to a predetermined value received from a device driver.

5. The method of claim 1, further comprising the steps of:
receiving an evict message for the texture map from a device driver, wherein the evict message is associated with the current entry of a level of detail limit value; and
initializing the current level of detail limit value stored for the texture map to a predetermined value.

6. The method of claim 1, further comprising the steps of:
receiving a second unclamped calculated level of detail value for the texture map;
comparing the second unclamped calculated level of detail value with the current level of detail limit value for the texture map;
determining that the second unclamped calculated level of detail value corresponds to a mipmap of the texture map that is lower resolution than a mipmap of the texture map corresponding to the current level of detail limit value for the texture map; and
discarding the second unclamped calculated level of detail value.

7. The method of claim 1, further comprising the steps of:
receiving a second unclamped calculated level of detail value for the texture map;
comparing the second unclamped calculated level of detail value with a current coarse level of detail limit value for the texture map that corresponds to a coarse mipmap level of detail of the texture map;
determining that the second unclamped calculated level of detail value corresponds to a mipmap of the texture map that is lower resolution than the coarse mipmap level of detail of the texture map; and
storing the second unclamped calculated level of detail value as the current coarse level of detail limit value.

8. The method of claim 1, further comprising the step of determining that texture map statistics tracking is enabled for a shader program accessing the texture map.

9. The method of claim 1, wherein the computing device executes an atomic reduction command to compare the unclamped calculated level of detail value with the current level of detail limit value for the texture map.

10. The method of claim 1, further comprising:
receiving a texture load instruction; and
in response to receiving the texture load instruction, storing the unclamped calculated level of detail value in a register.

11. The method of claim 10, further comprising:
receiving a reduction instruction that specifies a reduction operator;
retrieving the unclamped calculated level of detail value from the register;
retrieving a base address corresponding to a location of the level of detail array in a memory; and
performing the reduction instruction on the unclamped calculated level of detail value and level of detail array, based on the reduction operator.

12. The method of claim 1, further comprising causing a texture map associated with the unclamped calculated level of detail value to be loaded on a scene-by-scene basis for each application program in a group of application programs.

13. A non-transitory computer readable medium storing instructions that, when executed by a processor, cause the processor to track and report texture statistics, by performing the steps of:
calculating an unclamped level of detail value for a texture map;
comparing the unclamped level of detail value with a current level of detail limit value for the texture map;
determining that the unclamped level of detail value corresponds to a mipmap of the texture map that is higher resolution than a mipmap of the texture map corresponding to the current level of detail limit value;
storing the unclamped level of detail value in a level of detail array as the current level of detail limit value for the texture map;
for each shader included in a plurality of shaders, identifying whether the shader is enabled for texture map statistics tracking; and
if the unclamped calculated level of detail value is associated with a shader included in the plurality of shaders that is enabled for texture map statistics tracking, then generating a level of detail array update that includes the unclamped calculated level of detail value,
wherein the level of detail array update is used to report the unclamped calculated level of detail value as the current level of detail limit value stored in a level of detail array for the texture map, and
if the unclamped calculated level of detail value is associated with a shader included in the plurality of shaders that is not enabled for texture map statistics tracking, then discarding the unclamped calculated level of detail value.

14. The non-transitory computer readable medium of claim 13, wherein the step of comparing is performed by executing an atomic reduction command.

15. The non-transitory computer readable medium of claim 13, further comprising the steps of:
calculating a second unclamped level of detail value for a texture map;
comparing the second unclamped level of detail value with a current coarse level of detail limit value for the texture map;
determining that the unclamped level of detail value corresponds to a mipmap of the texture map that is lower resolution than a mipmap of the texture map corresponding to the current coarse level of detail limit value; and
storing the unclamped level of detail value in a level of detail array as the current coarse level of detail limit value.

16. The non-transitory computer readable medium of claim 13, further comprising the step of reading a level of detail array to determine which mipmap levels of detail for the texture map are used by an application program.

17. The non-transitory computer readable medium of claim 13, further comprising initializing the current level of detail limit value to a predetermined value received from a device driver.

18. The non-transitory computer readable medium of claim 13, further comprising determining that texture map statistics tracking is enabled for a shader program accessing the texture map.

19. A system for tracking and reporting texture map statistics, comprising:
a texture unit configured to:
calculate an unclamped level of detail value for a texture map;
compare the unclamped level of detail value with a current level of detail limit value for the texture map that is stored in an entry of a level of detail limit values table;
determine that the unclamped level of detail value corresponds to a mipmap of the texture map that is higher resolution than a mipmap of the texture map corresponding to the current level of detail limit value;

store the unclamped level of detail value as the current level of detail limit value for the texture map;

for each shader included in a plurality of shaders, identifying whether the shader is enabled for texture map statistics tracking; and if the unclamped calculated level of detail value is associated with a shader included in the plurality of shaders that is enabled for texture map statistics tracking, then generating a level of detail array update that includes the unclamped calculated level of detail value, wherein the level of detail array update is used to report the unclamped calculated level of detail value as the current level of detail limit value stored in a level of detail array for the texture map, and if the unclamped calculated level of detail value is associated with a shader included in the plurality of shaders that is not enabled for texture map statistics tracking, then discarding the unclamped calculated level of detail value.

20. The system of claim 19, further comprising:

a memory configured to store the level of detail array for the texture map; and a raster operations unit that is configured to:

receive the level of detail array update generated by the texture unit;

read a reported level of detail limit value stored in the level of detail array for the texture map from the memory;

compare the unclamped level of detail value included in the level of detail array update with the reported level of detail limit value;

determine that the unclamped level of detail value corresponds to a mipmap of the texture map that is higher resolution than a mipmap of the texture map corresponding to the reported level of detail limit value; and store the unclamped level of detail value in the memory as the reported level of detail limit value.

21. The system of claim 20, wherein the raster operations unit is further configured to compare the level of detail array with a second level of detail array to produce a list of update events.

22. The system of claim 19, wherein the texture unit is further configured to:

calculate a second unclamped level of detail value for the texture map;

compare the second unclamped level of detail value with a current coarse level of detail limit value for the texture map that corresponds to a coarse mipmap level of detail of the texture map;

determine that the second unclamped level of detail value corresponds to a mipmap of the texture map that is lower resolution than the coarse mipmap level of detail of the texture map; and store the second unclamped level of detail value as the current coarse level of detail limit value.

23. The system of claim 19, further comprising a device driver that is stored in memory and configured to evict the current level of detail limit value stored for the texture map that is stored in the entry of the level of detail limit values table and provide a predetermined value, and the texture unit is further configured to initialize the entry of the level of detail limit values table to the predetermined value in response to receiving an evict message from the device driver for the texture map.

24. The system of claim 19, wherein each entry in the level of detail limit values table includes a bit indicating whether or not texture map statistics tracking is enabled for the entry.

25. The system of claim 19, further comprising a device driver configured to read a level of detail array and determine which mipmap levels of detail for the texture map are used by an application program.

26. The system of claim 19, wherein each entry in the level of detail limit values table includes a mask indicating whether or not texture map statistics tracking is enabled for one or more different shader programs.

27. The system of claim 19, wherein the texture unit is further configured to execute an atomic reduction command to compare the unclamped level of detail value with the current level of detail limit value for the texture map.

28. The system of claim 19, wherein the texture unit is further configured to initialize the current level of detail limit value to a predetermined value received from a device driver.

* * * * *